United States Patent [19]
Dauvergne

[11] Patent Number: 4,997,268
[45] Date of Patent: Mar. 5, 1991

[54] CORRECTIVE LENS CONFIGURATION

[76] Inventor: Hector A. Dauvergne, 419 E. Merle Ct., San Leandro, Calif. 94547

[21] Appl. No.: 383,452

[22] Filed: Jul. 24, 1989

[51] Int. Cl.⁵ ............................................ G02C 7/02
[52] U.S. Cl. ..................................... 351/159; 351/167
[58] Field of Search ................................ 351/159, 167

[56] References Cited
U.S. PATENT DOCUMENTS

| | | | |
|---|---|---|---|
| 3,195,145 | 6/1964 | Tishen et al. | 351/159 |
| 3,628,854 | 12/1971 | Jampolsky | 351/175 |
| 3,744,882 | 6/1973 | Forster, Jr. | 350/241 |

FOREIGN PATENT DOCUMENTS 261742  6/1973  Fed. Rep. of Germany ...... 350/159

OTHER PUBLICATIONS

Holtham, J. W. "Prescriber's Guide to Special Lenses", *Optician;* vol. 139, No. 3604, Apr. 29, 1960, pp. 403–407.

*Primary Examiner*—Scott J. Sugarman
*Attorney, Agent, or Firm*—Bielen, Peterson & Lampe

[57] ABSTRACT

An optical lens for eyewear for correcting severe myopia molded from a lens blank having an outer perimeter portion and an inner central portion, and having an inside and outside surface, the inside and outside surface of the outer perimeter portion being without prescription and the inner central portion having a discontinuous inside surface with a raised beveled section around an inner concave section having a corrective curvature for myopia vision.

4 Claims, 1 Drawing Sheet

CORRECTIVE LENS CONFIGURATION

BACKGROUND OF THE INVENTION

This invention relates to an optical lens and in particular to a high power molded lens for use in eyewear for correction of severe myopia. The lens configuration disclosed relates to the compound lens construction of my prior application Ser. No. 318,956 filed Mar. 6, 1989 entitled LENTICULAR EYEWEAR AND METHOD OF FABRICATION.

In correction of severe myopia, the conventional lens is constructed with a relatively flat outer face and an inner face having an extreme curvature which results in a lens that is very thin at the center and very thick at the outer periphery where the lens engages the frame. The resulting lens is therefore exceptionally heavy and generally unattractive. While the use of lighter weight plastics can relieve some of the weight, plastics generally have a smaller coefficient of refraction than do speciality glass substances. To compensate for the lower refraction coefficient, the inner curvature must be further accentuated. It has been found, that individuals with severe myopia tend to look through only a small central area of each lens and, while conscious of peripheral images, tend to move their head to focus on such images instead of shifting their eyes to view through the periphery of the lenses.

In order to accommodate the desire for light weight lenses that can be used in large attractive frames, the discontinuous lens configuration of this invention was devised. The lens configuration can be inexpensively manufactured in any conventional mold system that is customarily employed in the manufacture of polymer lens blanks. The fabricated lens blank is preferably of conventional diameter with a substantial perimeter portion that is of conventional thickness and curvature and can be trimmed and fitted to the full range of frames that are ordinarily available to user's of eyewear requiring little or no correction.

SUMMARY OF THE INVENTION

The optical lens of this invention comprises a lens blank for corrective eyewear that has a unique configuration. The lens is fabricated as a molded lens blank with a perimeter having a conventional curvature and thickness commonly used in sunglasses and other non prescription lenses. The configuration of the lens blank enables the blank to be trimmed and contoured to fit all varieties of standard and custom lens frames. The molded lens of this invention is particularly designed for use in correcting severe myopism.

Traditionally, the lens for correcting severe myopia utilizes a lens blank having an inner concave surface and substantially flat outer surface. Optically, increased power can be obtained by making both the inside and outside surfaces concave. This design, however, provides for an extremely thin central region with a thick outer periphery. Furthermore, the appearance of the lens is extremely unattractive and therefore unsuitable for corrective eyewear.

While the compound lens of my referenced application is designed to correct extreme cases of myopia the proposed molded lens of this invention is designed to correct moderate to severe myopia. For example, the focal correction for this lens is designed for minus eight to minus fifteen whereas the compound lens can provide a correction of the focal length up to minus twenty five. It has been found that although an eyewear lens may be 50-60 millimeters in diameter, the wearer usually focuses his vision through the central 20-30 millimeters of the lens. The subject lens of this invention is therefore configured to include a corrective section only on the central portion of the lens. The corrective portion for severe myopia includes an edge that is raised from the surface of the outer non-corrective portion of the lens. The raised edge is beveled with a angle of inclination that coincides with the radial angle of the eye as the eye views through the lens. In this manner the beveled surface is not apparent to the eye and aberrant refraction is minimized. Although the simpler configuration has the corrective portion concentric with lens blank, it is preferred for the sake of appearance that the optically corrective portion be truncated on the top and bottom to give a more appealing and stylish appearance to the lens. Where necessary for increased correction, the outer surface of the lens blank can be flattened in the area of the corrective segment thereby increasing the focal correction of the inner portion of the lens blank. These and other features will become apparent from detailed consideration of the preferred embodiments.

DETAILED DESCRIPTION OF THE PREFERRED EMBODIMENTS

Figure 1:
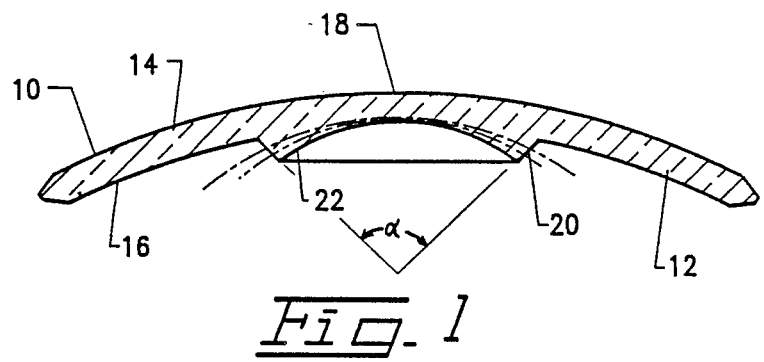
FIG. 1 is a cross sectional view of the lens of this invention taken on the diameter of the circular lens along the lines 1—1 in FIG. 3.
Figure 2:
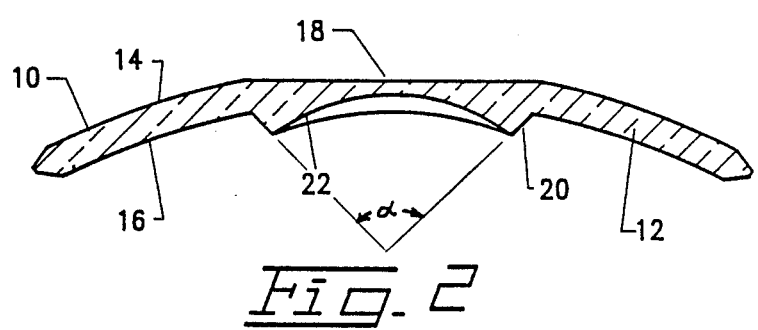
FIG. 2 is a cross sectional view of an alternate embodiment of the lens of this invention taken on the diameter of the circular lens along the lines 2—2 in FIG. 4.

Referring to the drawings, FIGS. 1 and 2 show a cross sectional view of the lens designated generally by the reference numeral 10. Both of the preferred embodiments of the lens 10, as shown additionally in FIGS. 3 and 4, have substantially the same cross section when taken on the horizontal diameter of the lens along lines 1—1 and 2—2 as shown in the respective figures. The lenses shown in the drawings are more accurately lens blanks which are trimmed and shaped to fit the configuration of a particular lens frame for conventional eyewear.

The lens or lens blank has a diameter of approximately 82 millimeters or any standard size and is constructed with a outer perimeter portion 12 having a uniform thickness of approximately 2 to 4 millimeters and having an outside lens curvature having a standard optical curve of approximately 5 or 6 which is common in sunglasses and other nonprescription lenses. The inside surface 16 of the outer perimeter portion 12 has a concentric curvature to the outside surface or has a curvature the same as or approximately that of the outside surface. The object of the perimeter portion 12 of the lens blank 10 is to provide a perimeter, that when shaped and trimmed, will fit conventional eyeglass frames. The central portion 18 of the lens blank 10 carries the prescription and comprises a beveled section 20 that is raised from the inside surface 16 to provide sufficient depth to the lens blank to enable an inside corrective surface 22 of high curvature to be imparted to the central portion 18 of the lens blank 10. The corrective surface 22 can be as shown in the cross section of FIG. 1, which has a standard curvature of minus 15, or may be any lesser curvature as schematically represented by dotted line therein to achieve the correction desired.

Figures 3, 4:
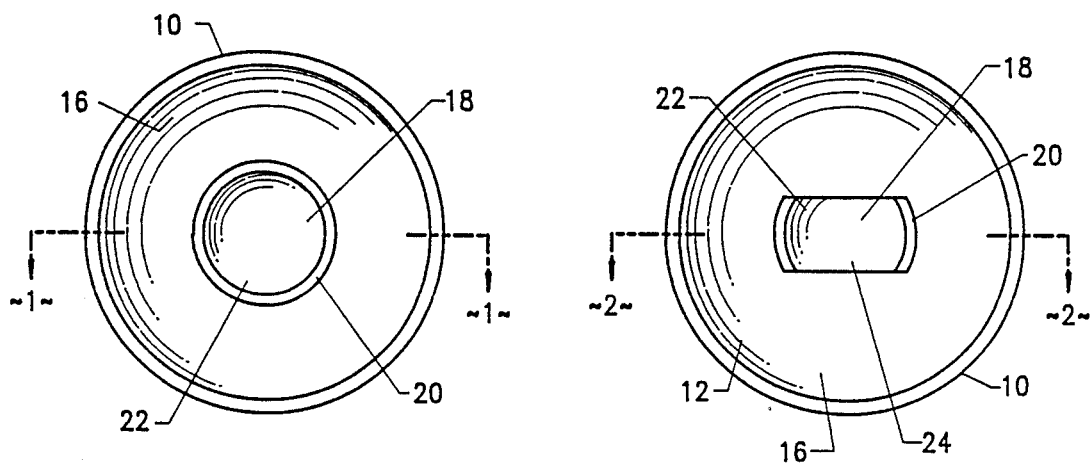
FIG. 3 is an elevational view of the inside face of the lens of FIG. 1.
FIG. 4 is an elevational view of the inside face of the modified configuration lens of FIG. 2.

Additionally, while it is preferred that the outside surface of the lens blank retain the curvature of the perimeter portion 12 as shown in FIG. 1, for severe correction of myopic vision the central portion 18 of the outside surface can be reduced in curvature down to the flat surface shown in the cross sectional view of the lens blank in FIG. 4. It is to be understood that the curvature of the central portion of the lens blank can be fabricated at any lens curvature between the base curvature of the perimeter portion and the flat surface, as shown by dotted line in the cross section of FIG. 2. Preferably, except for extreme correction, the focal correction in the devised lens is achieved by the curvature of the inside surface at the central portion at the lens blank. It is only in those extreme cases where the curvature of the central portion is maximized and further correction is required, that necessitates the flattening of the central portion of the outside surface. Flattening of the central portion of the outside surface is undesirable for asethetic purposes.

Referring to FIG. 3, the basic configuration of the lens utilizes a discontinuous inside surface 16 with a central portion 18 that has the curved corrective surface 22 and a beveled edge 20 in a concentric, circular arrangement on the perimeter of the central portion. In the alternate embodiment of FIGS. 2 and 4, a truncated concentric central portion is shown which cuts the perimeter of the central portion 18 above and below, providing a central horizontal band 24 which carries the curved corrective surface 22.

The bevel portions 20 on the lens blanks of FIGS. 1 and 3 are constructed with a beveled angle 60 of approximately one hundred thirty five degrees which approximates the radial angle from the pupil of the eye of the user when spaced from the lens during normal wear. In this manner, the wearer does not see the projected surface of the beveled portion 20 when looking straight through the lens and undesirable light and image refractions are minimized.

The lens blank is fabricated from a molded plastic material with the final prescription incorporated into the lens. Alternately the lens blank can be fabricated with a continuous outside surface and an inside surface with a raised central portion which can subsequently be ground and polished to the desired finished prescription. As the thickened beveled section of the lens adds little to the overall weight of the lens blank, the light weight characteristic of the lens can be maintained. The lens can be tinted or appropriately colored to comprise a corrective sunglass lens which tinting or coloring can further mask the high correction of the central portion of the lens blank. Being light in weight and yet providing the full degree of correction required by the wearer, the lens blank has utility in recreational glasses that are used for sports and other rigorous activities. Although the design is primarily directed at molded lenses, the discontinuous designed configuration of the corrective lens can be used for ground glass lenses where desirable. However, because of the discontinuous surface, the lens is primarily suitable for fabrication by molding.

While in the foregoing, embodiments of the present invention has been set forth in considerable detail for the purposes of making a complete disclosure of the invention, it may be apparent to those of skill in the art that numerous changes may be made in such detail without departing from the spirit and principles of the invention.

What is claimed is:

1. An optical lens for eyewear for correcting severe myopia comprising:
 a lens blank having a central portion, an outer perimeter portion around the central portion, an outside surface and an inside surface, the outer perimeter portion having a peripheral edge that is adapted to be shaped to fit a lens frame of conventional eyeglasses, the outside surface of the outer perimeter portion being convex and the inside surface of the outer perimeter portion being concave with standard eyewear lens curvatures without optical correction, and, the central portion having an inside surface discontinuous with the inside surface of the outer perimeter with a raised beveled section and an inner concave surface section, the beveled section arranged at least in part around the inner surface section, with the inner surface section having a corrective curvature cooperating with the outside curvature for correcting myopic vision, wherein the central portion has an outer surface section discontinuous with the outside surface of the outer perimeter portion with a corrective curvature cooperating with the corrective curvature of the inner surface section of the central portion of the central portion of the lens blank for correcting myopic vision.

2. The optical lens of claim 1 wherein the central portion is circular and concentric with the outer peripheral portion and the beveled section is circular in configuration and is around the central portion.

3. An optical lens for eyewear for correcting severe myopia comprising:
 a lens blank having a central portion, an outer perimeter portion around the central portion, an outside surface and an inside surface, the outer perimeter portion having a peripheral edge that is adapted to be shaped to fit a lens frame of conventional eyeglasses, the inside surface of the outer perimeter portion being concave with standard eyewear lens curvatures without optical correction, and, the central portion having an inside surface discontinuous with the inside surface of the outer perimeter with a raised beveled section and an inner concave surface section, the beveled section arranged at least in part around the inner surface section, with the inner surface section having a corrective curvature cooperating with the outside curvature for correcting myopic vision, wherein the beveled section of the central portion has an angle of bevel that approximates the radial angle from the pupil of the eye to the inside surface of the lens blank.

4. An optical lens for eyewear for correcting severe myopia comprising:
 a lens blank having a central portion, an outer perimeter portion around the central portion, an outside surface and an inside surface, the outer perimeter portion having a peripheral edge that is adapted to be shaped to fit a lens frame of conventional eyeglasses, the outside surface of the outer perimeter portion being convex and the inside surface of the outer perimeter portion being concave with standard eyewear lens curvatures without optical correction, and, the central portion having an inside surface discontinuous with the inside surface of the outer perimeter with a raised beveled section and an inner concave surface section, the beveled section arranged at least in part around the inner surface section, with the inner surface section having a corrective curvature cooperating with the outside curvature for correcting myopic vision, wherein the central portion is in part circular with a truncated top and bottom with the central portion forming a horizontal band in the lens when mounted in an eyeglass frame.

* * * * *